(12) United States Patent
Kawashima et al.

(10) Patent No.: US 7,557,484 B2
(45) Date of Patent: Jul. 7, 2009

(54) ELECTRIC MOTOR (75) Inventors: Yoshichika Kawashima, Kiryu (JP);
Shunji Kumagai, Kiryu (JP)

(73) Assignee: Mitsuba Corporation, Gunma (JP)

( * ) Notice: Subject to any disclaimer, the term of this patent is extended or adjusted under 35 U.S.C. 154(b) by 332 days.

(21) Appl. No.: 10/587,935

(22) PCT Filed: Feb. 8, 2005

(86) PCT No.: PCT/JP2005/001841

§ 371 (c)(1),
(2), (4) Date: Aug. 3, 2006

(87) PCT Pub. No.: WO2005/076442

PCT Pub. Date: Aug. 18, 2005

(65) Prior Publication Data

US 2007/0188040 A1    Aug. 16, 2007

(30) Foreign Application Priority Data

Feb. 10, 2004    (JP) .............................. 2004-033330

(51) Int. Cl.
*H02K 23/26* (2006.01)
(52) U.S. Cl. ................... 310/225; 310/198; 310/234
(58) Field of Classification Search ................ 310/198, 310/225, 234, 127–147, 148–151
See application file for complete search history.

(56) References Cited

U.S. PATENT DOCUMENTS

| | | | | |
|---|---|---|---|---|
| 841,545 A | * | 1/1907 | Latour | 310/225 |
| 1,782,242 A | * | 11/1930 | McNerney | 310/37 |
| 3,733,506 A | * | 5/1973 | Jaffe et al. | 310/198 |
| 4,638,204 A | * | 1/1987 | Kirchner et al. | 310/239 |
| 5,434,463 A | * | 7/1995 | Horski | 310/248 |
| 5,485,049 A | * | 1/1996 | Shannon et al. | 310/248 |
| 5,596,236 A | * | 1/1997 | Lee et al. | 310/68 A |
| 5,852,352 A | * | 12/1998 | Suriano | 318/541 |

(Continued)

FOREIGN PATENT DOCUMENTS

GB    2209439 A * 5/1989

(Continued)

*Primary Examiner*—Quyen Leung
*Assistant Examiner*—Naishadh N Desai
(74) *Attorney, Agent, or Firm*—Wenderoth, Lind & Ponack, L.L.P.

(57) ABSTRACT

In an electric motor having high-speed and low-speed brushes, durability is improved and vibration/noise is reduced. The electric motor has a low-speed brush 21a, a high-speed brush 21b, and a common brush 21c. Formed in the electric motor are a first coil 7A1 which is wound between given slots 11, and a second coil 7A2 which is wound in a direction opposite to a direction of the first coil 7A1 between slots 11 existing at positions point-symmetric to the given slots 11 with respect to a center of a rotation shaft. An armature coil 7 is formed by the first and second coils 7A1 and 7A2. If the armature coil 7 is short-circuited by the high-speed brush 21b, the first coil 7A1 and the second coil 7A2 of the short-circuited armature coil 7 exist at positions symmetric to each other with respect to an axis line extending through the center of the high-speed brush 21b and the center of the rotation shaft.

2 Claims, 7 Drawing Sheets

U.S. PATENT DOCUMENTS

| | | | |
|---|---|---|---|
| 6,043,581 A * | 3/2000 | Tanaka et al. | 310/197 |
| 6,114,792 A * | 9/2000 | Tiemeyer | 310/233 |
| 6,127,759 A * | 10/2000 | Tanaka et al. | 310/233 |
| 6,163,096 A * | 12/2000 | Michenfelder et al. | 310/239 |
| 6,566,782 B1 | 5/2003 | Wang | |
| 6,844,649 B2 * | 1/2005 | Tanaka et al. | 310/195 |
| 2003/0159271 A1 | 8/2003 | Wang | |
| 2004/0017124 A1 | 1/2004 | Wang | |
| 2004/0020028 A1 | 2/2004 | Wang | |
| 2004/0145268 A1 * | 7/2004 | Yamamoto et al. | 310/249 |
| 2004/0251760 A1 * | 12/2004 | Tanaka et al. | 310/154.06 |
| 2007/0188040 A1 * | 8/2007 | Kawashima et al. | 310/225 |

FOREIGN PATENT DOCUMENTS

| | | |
|---|---|---|
| JP | 5-336719 | 12/1993 |
| JP | 2002-305861 | 10/2002 |
| JP | 2003-47224 | 2/2003 |
| JP | 2003-92866 | 3/2003 |

\* cited by examiner

ELECTRIC MOTOR

TECHNICAL FIELD

The present invention relates to an electric motor built in a vehicle or the like, and particularly to an electric motor used in a drive source for a wiper device or the like and having high-speed and low-speed brushes.

BACKGROUND ART

In general, an electric motor with a brush (hereinafter abbreviated as a motor where appropriate) is often used as a drive source for a wiper device secured to a vehicle such as a car. A motor of this kind has a structure in which an armature with an armature coil wound around the armature is located to be rotatable inside a cylindrical yoke having an inner circumferential face equipped with magnets. The armature has an armature core engaged on and fixed to the outside of a rotation shaft. Plural long slots elongated in the axial direction are formed in the armature core. Winding wires are wound between these slots at predetermined intervals, to form plural coils. The coils are electrically conducted to commutator members attached to the rotation shaft. The commutator members slide on a brush, and supply electricity to the coils via the brush, thereby generating a magnetic field. The rotation shaft is driven by magnetic suction force and repulsive force which are generated between the commutator members and the magnets of the yoke.

Figure 11:
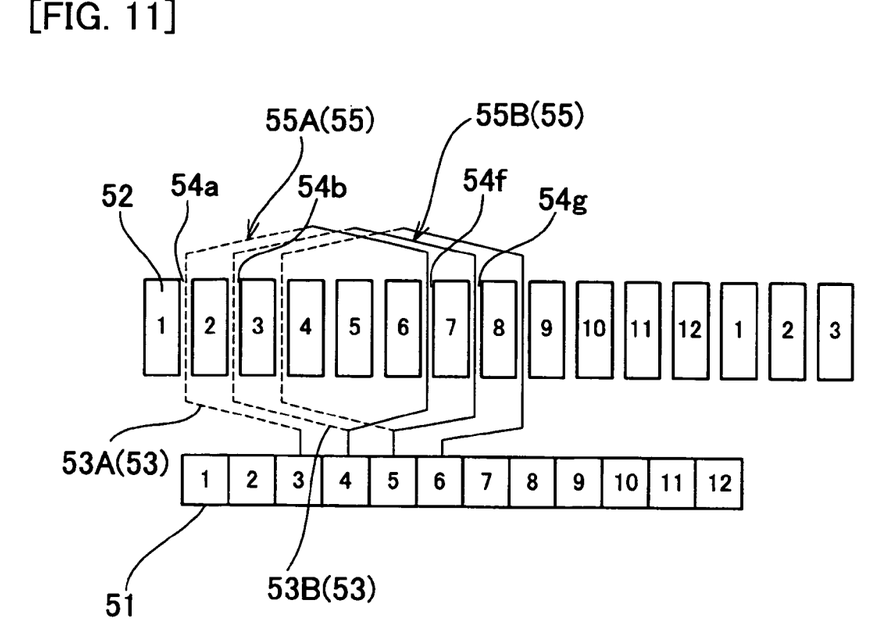
FIG. 11 An exploded view showing a winding state of an armature coil in a motor according to a conventional motor.

In the motor as described above, for example, coils are formed as follows in case of having two poles and twelve slots. FIG. 11 is an exploded view of an armature in which numerals 1 to 12 are respectively assigned to twelve commutator members 51, as well as twelve teeth 52. As shown in FIG. 11, for example, a winding wire 53A is wound out from the third commutator member. The winding wire is wound n turns (plural turns; for example, 66 turns) between a slot 54a and another slot 54f to form a coil 55A, where the slot 54a exists between the first and second teeth and the slot 54f exists between the sixth and seventh teeth. Thereafter, the winding wire is connected to the fourth commutator member. Next, another winding wire 53B is wound out from the fourth commutator member, and is then wound plural turns between a slot 54b and another slot 54g to form another coil 55B, where the slot 54b exists between the second and third teeth and the slot 54g exits between the seventh and eighth teeth. Thereafter, the winding wire is connected to the fifth commutator member. Likewise, winding wires 53 wound out from respective commutator members 51 each are wound plural turns between slots, to form coils 55. Thus, plural coils 55 are formed around the armature core.

Figure 12:
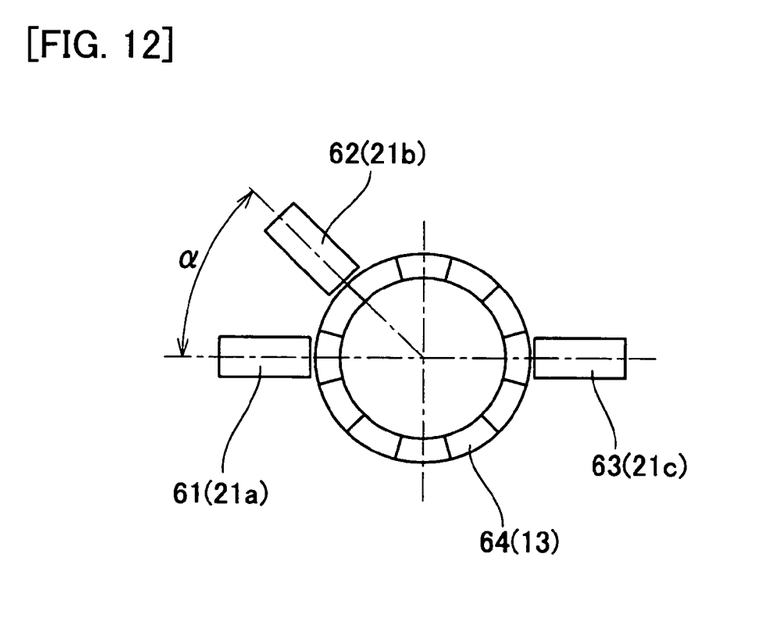
FIG. 12 An explanatory view showing a brush layout in a motor having a 3-brush structure.

Meanwhile, a motor used as a drive source of a wiper device is requested to perform high-speed rotation operation so as to cope with heavy rain and the like, in addition to normal operation which produces predetermined rotation output. That is, a motor for a wiper device needs two operation modes for a normal (low) speed and a high-speed. Besides, both operation modes have to be switched quickly from one another. In this motor, hence as shown in FIG. 12, a high-speed brush 62 used for high-speed operation (HI) is provided in addition to a low speed brush 61 used for normal operation (LOW). The rotation speed of the motor is changed by switching the brushes.

The low speed brush 61 and the high-speed brush 62 each coupled with a common brush 63 and form respectively pairs of brushes. The brushes 61 to 63 each slide on a commutator 64. During normal operation, the common brush 63 and the low speed brush 61 supply power. On the other side, during high-speed operation, either an anode brush or a cathode brush is switched to the high-speed brush 62, so that the common brush 63 and the high-speed brush 62 supply power. The high-speed brush 62 is located at a position shifted by an angle a in a rotation direction from the low speed brush 61. During high-speed operation, the motor is subjected to lead angle control so that the rotation speed increases higher than during normal operation. High-speed wipe operation can then be performed. Patent Document 1: Jpn. Pat. Appln. Laid-Open Publication No. 2002-305861

DISCLOSURE OF THE INVENTION

Problems to be Solved by the Invention

However, for a 3-brush motor having the high-speed brush 62 in addition to the low speed brush 61, the high-speed brush 62 is not necessary at all during normal operation but may short-circuit a coil 55 connected between adjacent commutator members if the high-speed brush 62 touches both commutator members. For example, in FIG. 11, a coil 55B is short-circuited if the high-speed brush 62 makes a contact bridging both of the fourth and fifth commutator members while the low speed brush 61 and the common brush 63 are in contact with the third and ninth commutator members during normal operation. That is, a coil which should not be short-circuited during normal operation is short-circuited by the high-speed brush 62 and makes electric circuits of the motor unbalanced. Therefore, abrasion of the common brush 63 and low speed brush 61 proceeds and conspicuous influences are seen particularly at a high voltage. This results in a problem that the product life is short.

Figure 13:
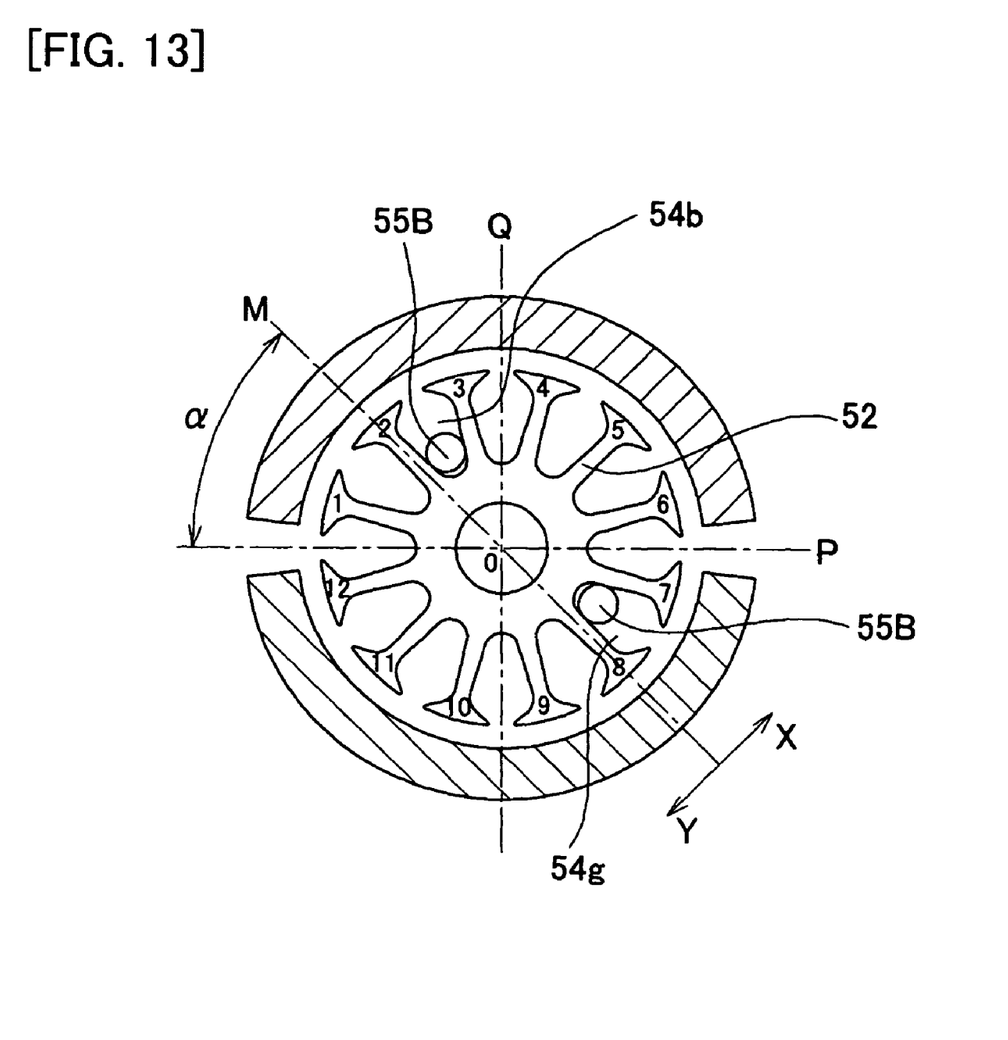
FIG. 13 An explanatory view showing a layout of short-circuited coils.

The 3-brush motor has another problem about the position of the coil short-circuited by a high-speed brush. FIG. 13 is an explanatory view showing a layout of a short-circuited coil. As described above, suppose that the coil 55B is short-circuited, for example, by the high-speed brush 62. This coil 55B is wound between slots 54b and 54g where the slot 54b exists between the second and third teeth while the slot 54g exists between the seventh and eighth teeth. The position of the coil 55B is now verified anew below. With respect to an axis line P extending through the centers of the low speed brush 61 and common brush 63 and another axis line Q vertical to the axis line P, one coil 55B exists in each of two sides divided by the axis lines P and Q. The number of short circuited coils is evenly distributed with respect to the lines P and Q.

However, as shown in FIG. 13, with respect to axis line M corresponding to the position of the high-speed brush 62, coils 55B exist biased to only one side (in the side of the area X in the figure). That is, two short-circuited coils exist in the side of the area X with respect to the axis line M while no short-circuited coil exists in the side of the area Y. Therefore, the number of coils through which a current flows is not uniform between the sides of the areas X and Y about the axis line M. As a result, magnetic balance is broken thereby raising a problem that whirling force is generated which may cause vibration and noise.

An object of the present invention is to improve durability and to reduce vibration/noise in an electric motor having high and low speed brushes.

Means for Achieving the Object

An electric motor according to the present invention characterized by comprises: an armature core attached to a rotation shaft, having plural teeth radially extending in radial directions, and plural slots formed between teeth and extending along an axis direction; a commutator provided on the rotation shaft to be adjacent to the armature core, with commutator members arranged in a circumferential direction, the commutator members being equal in number to the slots; a first brush which slides on the commutator; a second brush which is provided apart from the first brush by a predetermined angle in a circumferential direction, and slides on the commutator; a third brush which slides on the commutator and is used with either the first or second brush; and an armature coil which is electrically connected between adjacent ones of the commutator members, having a first coil wound between given ones of the slots, and a second coil, which is wound in an opposite direction to a direction of the first coil between slots existing at positions point-symmetric to the given ones of the slots with respect to a center of the rotation shaft, the armature coil being configured such that when the second brush contacts the adjacent ones of the commutator members to short-circuit the first and second coils through the second brush, the first and second coils exist at symmetric positions with respect to an axis line extending through a center of the second brush and the center of the rotation shaft.

In the motor of the present invention, even if the armature coil is short-circuited by the second brush, the first and second coils of the armature coil exist at symmetric positions with respect to an axis line extending through the center of the second brush and the center of the rotation shaft. Therefore, short-circuited coils are located in a symmetric layout with respect to a given centerline including this axis line. Accordingly, even in a motor having a 3-brush structure, coils short-circuited by the second brushes can be located without being biased, and electric circuits between brushes can be equalized, abrasion of the brushes can be suppressed, and product life can be extended. Also, uneven distribution of short-circuited coils is eliminated. Therefore, magnetic balance is stabilized and whirling force generated in the armature can be suppressed so that vibrations and noise can be reduced.

In the electric motor described above, the first and second coils may be connected in series with each other. Alternatively, the first and second coils can be connected in parallel with each other.

The electric motor described above can be configured such that each of the first and second coils has a main coil wound between two of the slots, and a subsidiary coil wound only along any one of the slots between which the main coil is wound. As a result of this, each subsidiary coil can be wound 0.5 turns around the armature core. Therefore, for example, if the number of winding turns of the armature coil is an odd number, the first and second coils each can be wound an equal number of turns by winding each of the two main coils an equal number of turns. Accordingly, the first and second coils exist at symmetric positions with respect to an axis line extending through the center of the second brush and the center of the rotation shaft, regardless of whether the number of winding turns is an even or odd number. Even if the armature coil is short-circuited by the second brush, short-circuited coils are arranged to be symmetric to each other with respect to any given centerline including this axis line.

Each of the main coils of the first and second coils may be wound by an equal number of turns around the armature core, and each of the subsidiary coils may be wound on the armature core by 0.5 turns around the armature core. In this case, as mentioned above, even if the number of winding turns of the armature coil formed between adjacent commutator members is an odd number, the first and second coils each can be wound an equal number of times on the armature core.

Further, the subsidiary coils may be formed between the main coils of the first and second coils. In this case, for example, after the main coil of the first coil is formed and the winding wire goes through any one of the slots between which the main coil is wound, the winding wire is inserted through any one of the slots between which the main coil of the second coil is wound. Thereafter, the main coil of the second coil is wound.

An electric motor according to the present invention characterized by comprises: an armature core attached to a rotation shaft, having plural teeth radially extending in radial directions, and plural slots formed between teeth and extending along an axis direction; a commutator provided on the rotation shaft to be adjacent to the armature core, with commutator members arranged in a circumferential direction, the commutator members being equal in number to the slots; a first brush which slides on the commutator; a second brush which is provided apart from the first brush by a predetermined angle in a circumferential direction, and slides on the commutator; a third brush which slides on the commutator and is used with either the first or second brush; and an armature coil which is electrically connected between adjacent ones of the commutator members, having a first coil wound between given ones of the slots, and a second coil, which is wound in an opposite direction to a direction of the first coil between the same slots as the given ones of the slots, the armature coil being configured such that when the second brush contacts the adjacent ones of the commutator members to short-circuit the first and second coils through the second brush, the first and second coils exist on an axis line extending through a center of the second brush and the center of the rotation shaft.

In the motor of the present invention, even if the armature coil is short-circuited by the second brush, the first and second coils of the armature coil exist on an axis line extending through the center of the second brush and the center of the rotation shaft. Therefore, short-circuited coils are located in a symmetric layout with respect to a given centerline including this axis line. Accordingly, even in a motor having a 3-brush structure, coils short-circuited by the second brushes can be located without being biased, and electric circuits between brushes can be equalized, abrasion of the brushes can be suppressed, and product life can be extended. Also, uneven distribution of short-circuited coils is dissolved. Therefore, magnetic balance is stabilized and whirling force generated in the armature can be suppressed so that vibrations and noise can be reduced.

In the electric motor described above, the slots may be an even number of slots not less than eight.

Effects of the Invention

According to an electric motor of the present invention, an electric motor having a 3-brush structure having first to third brushes is provided with an armature coil having a first coil which is wound between given ones of slots, and a second coil which is wound in an opposite direction to a direction of the first coil between slots existing at positions point-symmetric to the given ones of the slots with respect to a center of a rotation shaft. In addition, when the second brush contacts the adjacent ones of the commutator members to short-circuit the first and second coils through the second brush, the first and second coils exist at symmetric positions with respect to an axis line extending through a center of the second brush and the center of the rotation shaft. Therefore, coils short-circuited by the second brush can be located in a layout symmetric to a given centerline including the axis line. Accordingly, even in the motor having a 3-brush structure, coils short-circuited by the second brush can be located without uneven distribution. As a result of this, the electric circuits between brushes are equalized, abrasion of brushes is suppressed, and the product life is extended. Further, uneven distribution of short-circuited coils is eliminated. Therefore, magnetic balance is stabilized and whirling force generated in the armature can be suppressed so that vibrations and noise can be reduced Also according to the electric motor of the present invention, the configuration can be arranged such that each of the first and second coils has a main coil wound between two of the slots, and a subsidiary coil wound along any one of the two of the slots between which the main coil is wound. Accordingly, each subsidiary coil can be wound 0.5 turns around the armature core. For example, if the number of winding turns of the armature coil is an odd number, the numbers of turns of both main coils can be equalized if the first and second coils each are wound an equal number of turns. As a result of this, the first and second coils can be located at symmetric positions with respect to an axis line extending through the center of the second brush and the center of the rotation shaft even if the number of winding turns is an odd number. If the armature coil is short-circuited by the second brush, short-circuited coils can be located to be symmetric to each other with respect to any given centerline including this axis line. Therefore, regardless of whether the number of winding turns is an even or odd number, coils short-circuited by the second brush can be located without uneven distribution, in the motor having a 3-brush structure. Accordingly, product life can be extended and vibration/noise can be reduced.

According another electric motor of the present invention, an electric motor having a 3-brush structure having first to third brushes is provided with an armature coil having a first coil which is wound between given ones of slots, and a second coil which is wound in an opposite direction to a direction of the first coil between the same slots as the given ones of the slots. In addition, when the second brush contacts the adjacent ones of the commutator members to short-circuit the first and second coils through the second brush, the first and second coils exist on an axis line extending through a center of the second brush and the center of the rotation shaft. Therefore, coils short-circuited by the second brush can be located in a layout symmetric to a given centerline including the axis line. Accordingly, even in the motor having a 3-brush structure, coils short-circuited by the second brush can be located without uneven distribution. As a result of this, the electric circuits between brushes are equalized, abrasion of brushes is suppressed, and the product life is extended. Further, uneven distribution of short-circuited coils is eliminated. Therefore, magnetic balance is stabilized and whirling force generated in the armature can be suppressed so that vibrations and noise can be reduced.

EXPLANATION OF REFERENCE SYMBOLS

1 Electric motor
2 Motor housing
3 Armature
4 Permanent magnet
5 Rotation shaft
6 Armature core
7 Armature coil
7A, 7B Armature coil
7A1, 7B1 First coil
7A2, 7B2 Second coil
8 Metal plate
9 Tooth
11 Slot
11a, 11b, 11f, 11g, 11h, 11l Slot
12 Winding wire
13 Commutator
14 Commutator member
14b, 14c, 14d, 14e, 14h, 14i, 14j Commutator member
15 Riser
16 Bearing
17 Cover
18 Holder stay
19 Brush holder
21 Brush
21a Low-speed brush
21b High-speed brush
21c Common brush
31, 31A, 31B Main coil
32, 32A, 32b Subsidiary coil
51 Commutator member
52 Tooth
53 Winding wire
53A, 53B Winding wire.
54a, 54b, 54f, 54g Slot
55 Coil
55A, 55B Coil
61 Low-speed brush
62 High-speed brush
63 Common brush
64 Commutator
M, P, Q Axis line
O Center

BEST MODE FOR CARRYING OUT THE INVENTION

Hereinafter, embodiments of the present invention will now be described in detail on the basis of the drawings.

Embodiment 1

Figure 1:
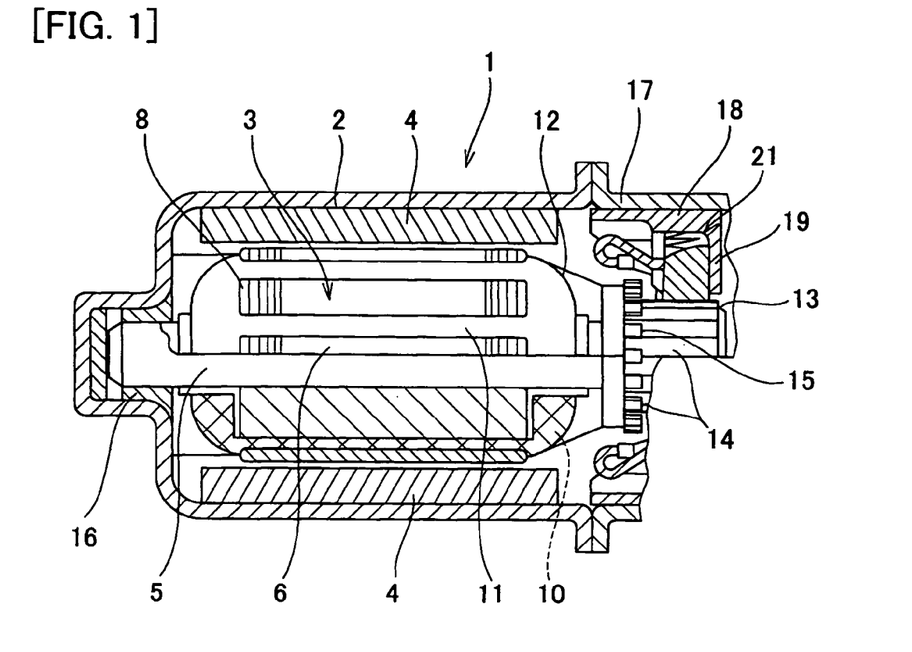
FIG. 1 A partial cross-sectional view showing a structure of an electric motor according to an Embodiment 1 of the present invention.

FIG. 1 is a partial cross-sectional view showing a structure of an electric motor according to the Embodiment 1 of the present invention. The motor 1 is used as a drive source of an automotive wiper device. As shown in FIG. 1, the motor 1 has a structure in which an armature 3 is located rotatably in a motor housing 2 having a bottomed cylindrical shape. Paired permanent magnets 4 are fixed to an inner circumferential face of the motor housing 2. The electric motor 1 is constructed to have two poles by these paired permanent magnets 4.

The armature 3 has an armature core 6 fixed to a rotation shaft 5, and armature coils 7 wound around the armature core 6. The armature core 6 is constituted by layering plural ring-shaped metal plates 8. On the outer circumferential portions of the metal plates 8, plural (twelve in this embodiment) T-shaped teeth 9 (see FIG. 3) are formed radially along the circumferential direction. The plural metal plates 8 are engaged on the rotation shaft 5 so as to stop rotation of the metal plates 8. In this manner, slots 11 like dovetail grooves are recessed in the outer circumference of the armature core 6 between adjacent teeth 9. The slots 11 extend in the axial direction, and plural (twelve) slots 11 are formed along the circumferential direction. Winding wires 12 coated with enamel are wound between the slots 11 provided at predetermined intervals, thereby to form plural armature coils 7 on the outer circumference of the armature core 6.

A commutator (commutator) 13 is provided adjacent to one end side of the armature core 6. The commutator is engaged on and fixed to the rotation shaft 5. Plural (twelve in this embodiment) commutator members 14 formed of conductive material are attached to the outer circumferential face of the commutator 13. The commutator members 14 each are made of a plate-like metal member elongated in the axial direction. The commutator members 14 are isolated from each other and are fixed and arranged parallel with one another along the circumferential direction. A riser 15 bent to fold back to an outer diameter side is integrally formed on an end of each commutator member 14 in the side of the armature core 6. Winding wires 12 forming starting and trailing ends of the armature coils 7 are wound around the risers 15 and fixed by fusing. In this manner, commutator members 14 and corresponding armature coils 7 are electrically connected to one another.

An end portion of the rotation shaft 5 is rotatably supported by a bearing 16 attached to the motor housing 2. The armature 3 is attached to be rotatable inside the motor housing 2. An open end of the motor housing 2 is provided with a cover 17. Inside this cover 17, a holder stay 18 is attached. Brush holders 19 are formed on the holder stay 18 at three positions along a circumferential direction. Brushes 21 each are attached to be retractable in the brush holder 19. A protruding tip end portion of each brush 21 (the tip end portion in the inner diameter side) is in slide contact with the commutator 13. A power source from outside is supplied to the commutator 13 through the brushes 21.

The motor 1 is provided with, as the brushes 21, a low-speed brush (first brush) 21a, a high-speed brush (second brush) 21b, and a common brush (third brush) 21c. The brushes 21a to 21c are arranged in the same layout as in FIG. 12. The high-speed brush 21b is provided apart by an angle a (for example, 45°) in the rotation direction from the low-speed brush 21a. Further, power is supplied by the common brush 21c and the low-speed brush 21a during normal operation, as well as by the common brush 21c and the high-speed brush 21b during high-speed operation. During high-speed operation, lead angle is performed on the motor 1 by the high-speed brush 21b, to operate at a higher speed than during normal operation. Note that any of the side of the brush 21c and the side of the brushes 21a and 21b may be an anode or cathode.

Figure 2:
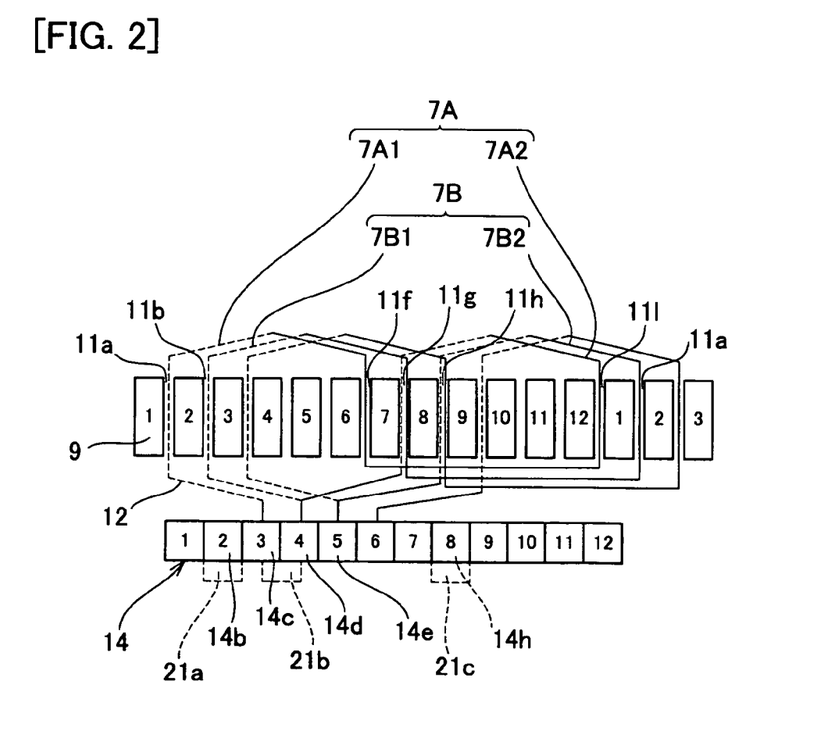
FIG. 2 A partial exploded view showing a winding state of an armature coil in the motor shown in FIG. 1.

In this motor 1, the armature coils 7 are wound in the manner described below. FIG. 2 is a partial exploded view showing winding positions of the armature coils 7 in the armature 3. The armature coils 7 of the motor 1 are wound in a lap winding method. The winding wires 12 are sequentially wound between those two slots 11 that sandwich four slots 11 therebetween, forming short-pitch winding. As shown in FIG. 2, an end of the winding wire 12 is wound starting from the third commutator member 14c and is wound around a riser 15 of the third commutator member 14c. This winding wire 12 is wound between slots 11a and 11f where the slot 11a exists between the first and second teeth 9 and the slot 11f exists between the sixth and seventh teeth 9. The first coil 7A1 (hereinafter abbreviated as a coil 7A1) is thus formed. The coil 7A1 is wound by half of the number of turns n according to conventional art (n/2; 33 turns in this embodiment).

The coil 7A1 is not immediately connected to the fourth commutator member 14d thereafter, unlike in the conventional method, but is wound between the slots 11l and 11g which are opposed to the slots 11f and 11a in radial directions, i.e., the slots 11l and 11g exist at positions rotated by 180° in the circumferential direction where the slot 11l exists between the twelfth and first teeth 9 and the slot 11g exists between the seventh and eighth teeth 9, thereby forming a second coil 7A2 (hereinafter abbreviated as a coil 7A2). The coil 7A2 is wound by half of the number of turns n according to conventional art (n/2; 33 turns in this embodiment) in an opposite direction to that of the coil 7A1, and is then connected to the fourth commutator member 14d.

Figure 3:
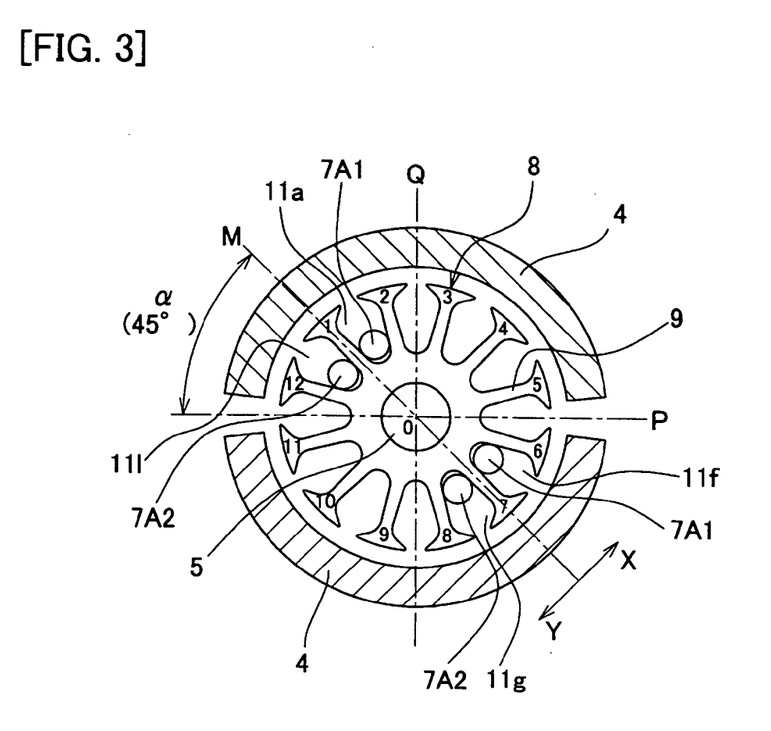
FIG. 3 An explanatory view showing the winding position of the armature coil.

Thus, an armature coil 7A having paired coils 7A1 and 7A2 opposed to each other in radial directions and connected in series with each other is formed between the third and fourth commutators 14c and 14d. FIG. 3 is an explanatory view showing a winding state of the armature coil 7A. As shown in FIG. 3, the coils 7A1 and 7A2 are wound such that winding directions are opposite to each other with the first and seventh teeth interposed therebetween. When the armature coil 7A is electrically conducted, opposing electromagnetic forces are generated. The coils 7A1 and 7A2 are formed at positions symmetric to each other with respect to an axis line M penetrating through the center of the high-speed brush 21b and the center O of the rotation shaft 5. If the axis line M coincides with the centers of the first and seventh teeth, the coils 7A1 and 7A2 are considered as being wound to be symmetric to one another with respect to the axis line M. That is, the coils 7A1 and 7A2 are distributed evenly to an X region as a half side and to a Y region as the other half side about the axis line M as a center boundary. Including other centerlines (axis lines P, Q, etc.) than the axis line M, the coils 7A1 and 7A2 are distributed evenly about a given centerline penetrating through the center O.

The winding wire 12 connected to the fourth commutator 14d is continuously wound between the slots 11b and 11g where the slot 11b exists between the second and third teeth 9 and the slot 11g exists between the seventh and eighth teeth 9, thereby forming a coil 7B1 (first coil). The coil 7B1 is also wound by half of the number of turns n according to conventional art (n/2; 33 turns in this embodiment). The coil 7B1 is then wound between the slots 11a and 11h which are opposed to the slots 11g and 11b in radial directions, i.e., the slots 11a and 11h exist at positions rotated by 180° in the circumferential direction where the slot 11a exists between the first and second teeth 9 and the slot 11h exists between the eighth and ninth teeth 9, thereby forming a coil 7B2 (second coil). The coil 7B2 is wound by half of the number of turns n according to conventional art (n/2; 33 turns in this embodiment) in an opposite direction to that of the coil 7B1, and is then connected to the fifth commutator member 14e. Thus, an armature coil 7B having paired coils 7B1 and 7B2 opposed to each other in the radial directions and connected in series with each other is formed between the fourth and fifth commutators 14d and 14e.

Similarly, the winding wires 12 connected to each commutator member 14 form an armature coil 7 between adjacent commutator members 14, forming first and second coils having the reverse winding directions and being opposed to each other in the radial directions. Thus, the armature coil 7 is formed by first and second coils 7xA and 7xB distributed evenly to the X and Y regions divided by a given centerline including the axis line M.

If the number of winding turns n of an armature coil 7 is an even number, a winding wire is wound n/2 turns on each of the first and second coils. Otherwise, if it is an even number, the number of turns by which a winding wire is wound on any one of the coils is increased by one than another number of turns. That is, if the first coil side is set to (n+1)/2 turns, the second coil side is set to (n−1)/2 turns. Otherwise, if the first coil side is set to (n−1)/2 turns, the second coil side is set to (n+1)/2 turns.

In the motor 1 having the winding structure as described above, consideration is taken into a case where the low-speed brush 21a contacts the second commutator member 14b and the common brush 21c contacts the eighth commutator member 14h during normal operation, for example, as shown in FIG. 3. At this time, the high-speed brush 21b contacts the third and fourth commutator members 14c and 14d so that the armature coil 7A is short-circuited. In a conventional motor, as shown in FIG. 13, the short-circuited coils are distributed unevenly with respect to the axis line M, causing problems in view of magnetic balance. In contrast, in the motor 1 of the present invention, the armature coils 7A (coils 7A1 and 7A2) are distributed evenly to the regions X and Y with respect to the axis line M as shown in FIG. 3. Also, the coils 7A1 and 7A2 are arranged evenly with respect to each of other given centerlines such as axis lines P and Q, in two halves sectioned by the centerline.

Thus, the motor 1 is capable of symmetrically distributing short-circuited coils with respect to a given centerline including an axis line M by adopting the winding structure as described above even if the armature coil 7 is short-circuited by the high-speed brush 21b during normal operation. Therefore, short-circuited coils can be distributed without uneven distribution even in a motor having a 3-brush structure having high-speed and low-speed brushes. Accordingly, electric circuits between brushes are equalized, abrasion of brushes is suppressed, and the product life is extended.

Figure 4:
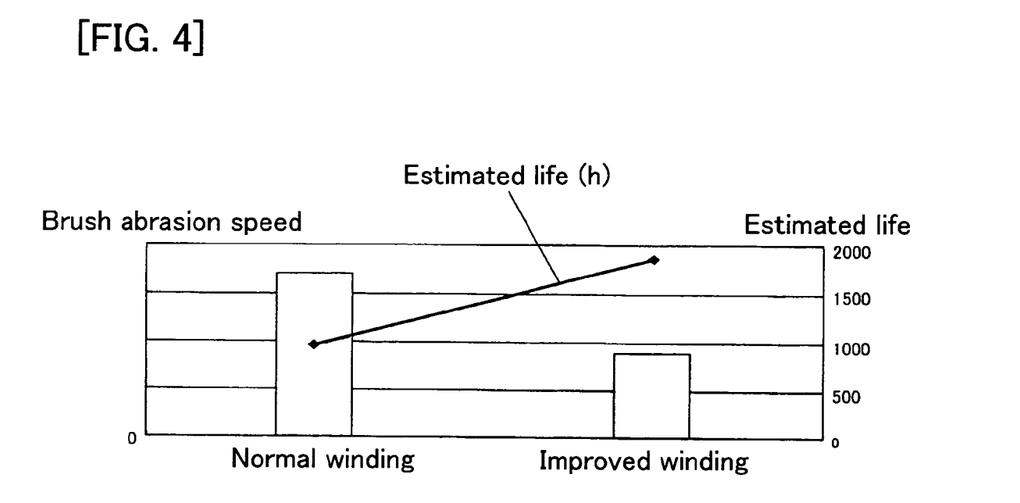
FIG. 4 A graph showing a result of a test conducted by the present inventors.

FIG. 4 is a graph showing a result of carrying out an endurance test under conditions of an applied voltage of 42V, an operation form of LOW conduction/continuation, and an overloaded state. As shown in FIG. 4, the motor (improved winding wires) according to the present invention resulted in that the brush abrasion speed was reduced to half and the estimated life is extended to about double. In particular, this experiment was carried out at a high voltage of 42V. The life at a high voltage greatly exceeded that of a conventional motor. It could be confirmed that a remarkable effect can be obtained by a motor having a spec of a high voltage. At 12V, the durability also improves.

The present motor 1 also solves uneven distribution of short-circuited coils, and therefore, the magnetic balance is stabilized. Therefore, the whirling force which is generated in the armature 3 can be suppressed, so that vibration and noise can be reduced. Accordingly, vibrations and operation noise of a wiper device from the motor 1 as a drive source can be reduced. Thus, calmness of the operating environment can be improved.

Further, when winding wires 12 are wound on the armature core 6, coils 7A1 and 7A2 are formed continuously at two positions, i.e., a given position and at another position opposed in a radial direction to the given position. Therefore, neither optional member nor particular installation work is needed. As a result of this, members used for a conventional motor can be directly used, so that endurance can be improved and vibration/noise can be reduced without increasing costs.

Figure 5:
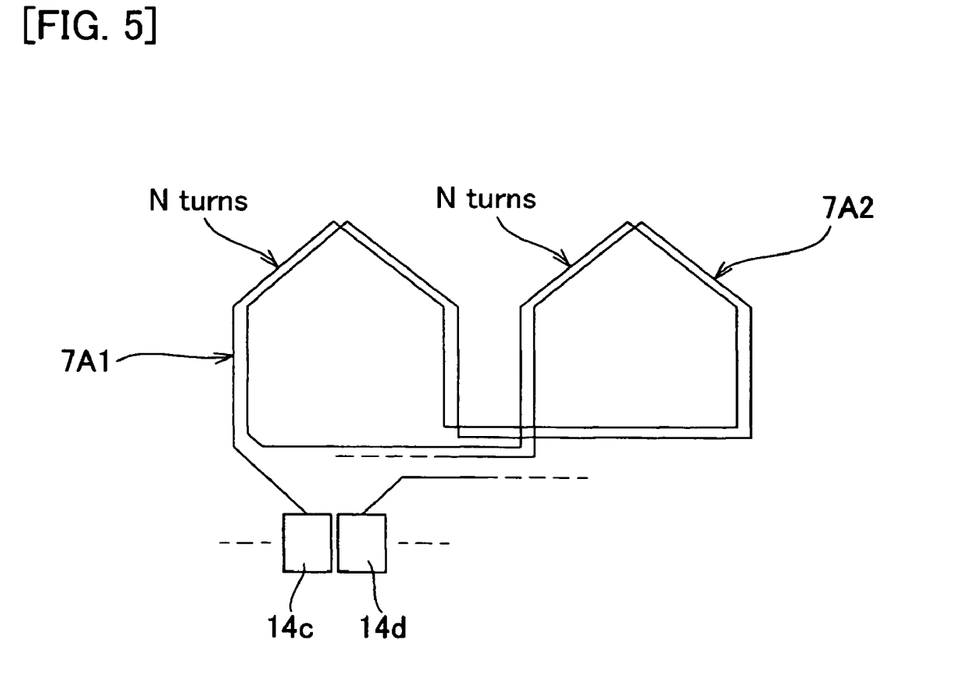
FIG. 5 An explanatory view showing another case example concerning a method for forming an armature coil.
Figure 6:
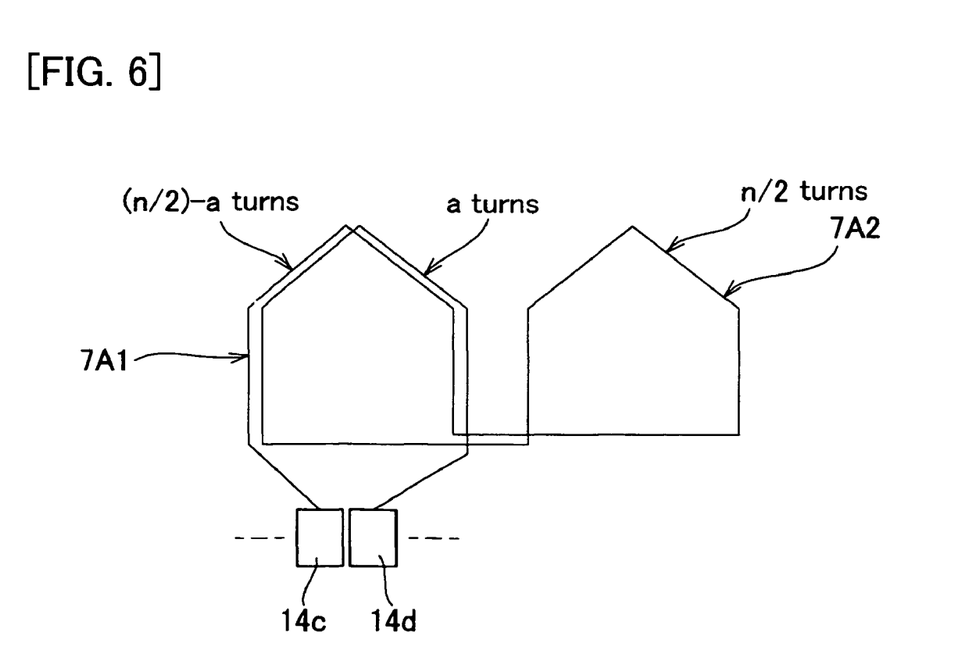
FIG. 6 An explanatory view showing another case example concerning a method for forming an armature coil.

Meanwhile, in the motor 1 described above, an armature coil 7 is formed by winding a first coil and thereafter winding a second coil. The method for forming the armature coil 7 is not limited to this but various winding patterns are available. FIGS. 5 and 6 are explanatory views showing other example cases concerning the method for forming the armature coil 7.

In the method shown in FIG. 5, the first and second coils are formed alternately. That is, compared to the foregoing example, a coil 7A1 is wound one turn from the third commutator member 14c through the slots 11a and 11f. Thereafter, a coil 7A2 is wound one turn through the slots 11l and 11g. Thereafter, the winding wire returns to the slots 11a and 11f, and the coil 7A1 is wound one turn again. Further, the coil 7A2 is wound one turn through the slots 11l and 11g. In this case, every one turn need not always be wound on the coil 7A1 side and the coil 7A2 side (N=1). For example, every plural turns may be wound alternately on both sides, such as N=(n/2)/3, (n/2)/4, (n/2)/5, . . . (every N=11 turns where N=(n/2)/3 in case of n=66 turns).

In the method shown in FIG. 6, at first, a winding wire is wound by a predetermined number of times on the first coil side. Thereafter, the winding wire goes to the second coil side, and is wound on this second coil by all turns. At last, the winding wire returns again to the first coil side, and is wound on the first coil side by the remaining number turns. That is, compared to the foregoing example, (n/2)-a turns are wound on the coil 7A1 side at first, and next n/2 turns are wound on the coil 7A2 side. At last, a turns are wound on the coil 7A1 (the coil 7A1 is wound n/2 turns). For example, of total 66 turns, 16 turns are wound on the first coil side. Thereafter, the winding wire goes to the second coil side, 33 turns are wound on the second coil side. Thereafter, the winding wire returns to the first coil side, and 17 turns are wound.

Figure 7:
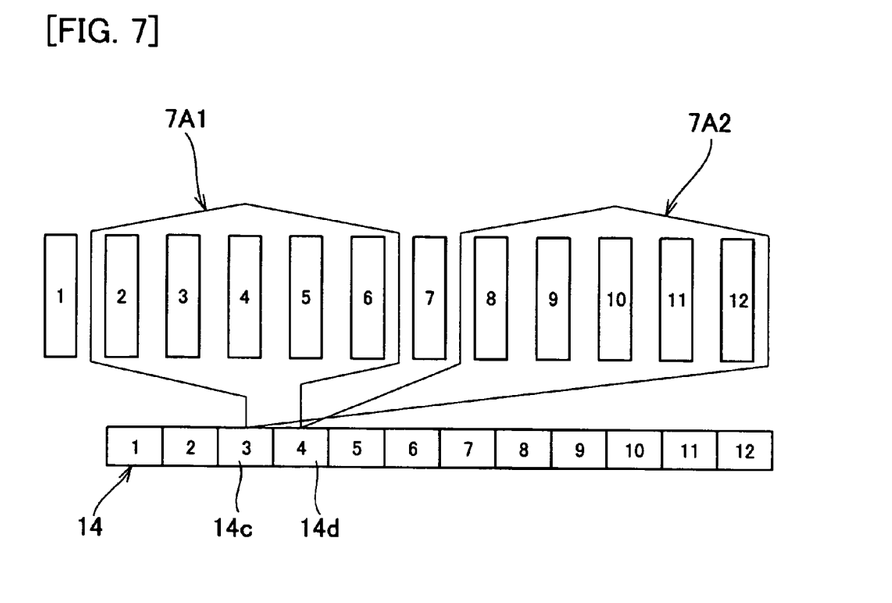
FIG. 7 An explanatory view showing a winding state in case where first and second coils are formed in parallel.

Meanwhile, in the motor 1 described above, the first and second coils are connected in series. However, these coils can be formed in parallel. FIG. 7 is an explanatory view showing a winding state in case where the first and second coils are formed in parallel. In this case, for example, coils 7A1 and 7A2 are wired in parallel with a third commutator member 14c, as shown in FIG. 7. In short, the coil 7A1 wound between slots 11a and 11f and the coil 7A2 wound between slots 11l and 11g are separately formed on the third commutator member 14c. These coils form an armature coil 7.

Embodiment 2

Figure 8:
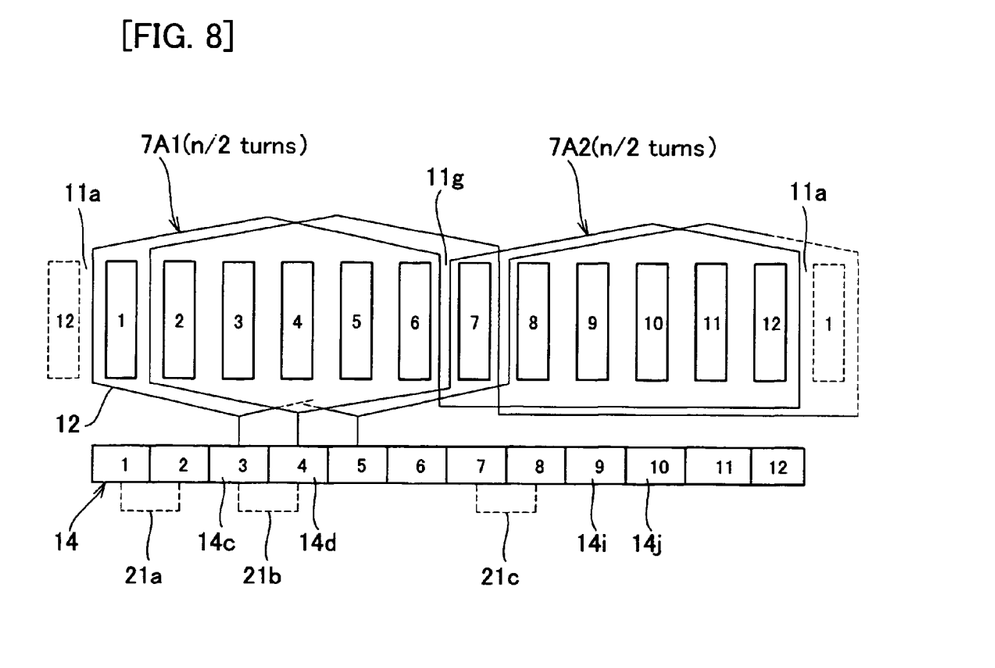
FIG. 8 An exploded view showing a winding state of an armature coil in a motor according to an Embodiment 2 of the present invention.
Figure 9:
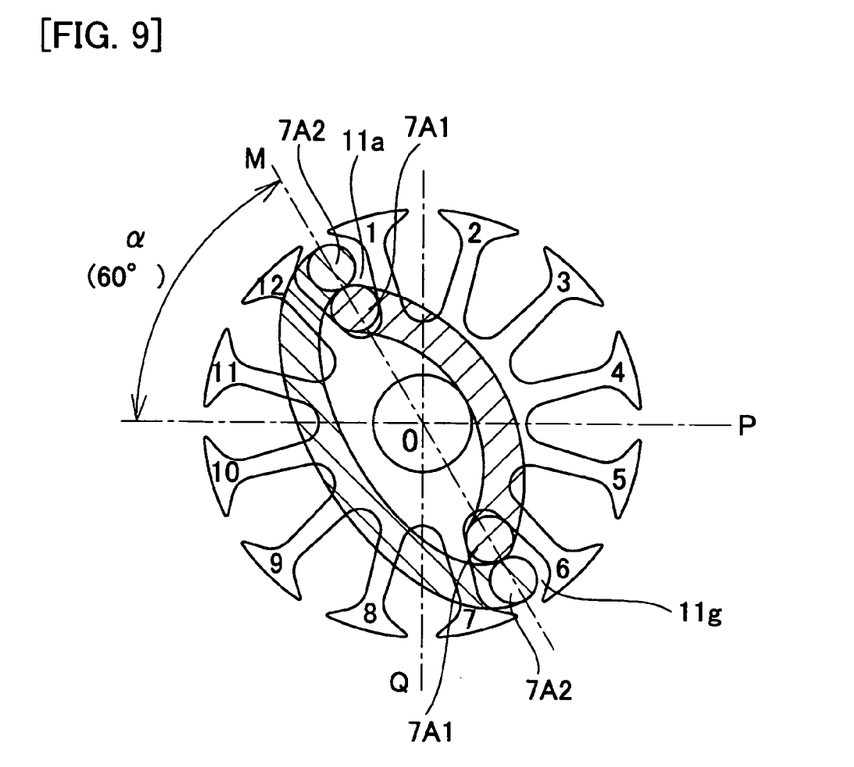
FIG. 9 An explanatory view showing a winding position of the armature coil in the motor shown in FIG. 8.

Next, description will be made of a case where armature coils form full-pitch winding as Embodiment 2 of the present invention. FIG. 8 is an exploded view showing a winding state of an armature coil in a motor according to the Embodiment 2 of the present invention. FIG. 9 is an explanatory view showing a winding position of the armature coil in the motor shown in FIG. 8. The whole structure of the motor is the same as that in FIG. 1. Therefore, description thereof will be omitted herefrom. In the following embodiment, the same members and parts as those in the Embodiment 1 are denoted at the same reference symbols, and detailed description thereof will be omitted.

As shown in FIG. 8, for example, an end of the armature coil according to the Embodiment 2 is wound from the third commutator member 14c. The winding wire 12 wound around the riser of the third commutator member 14c is wound between slots 11a and 11g thereby forming a coil 7A1 where the slot 11a exists between the twelfth and first teeth 9 and the slot 11g exists between the sixth and seventh teeth 9. The coil 7A1 is wound by half of the number of turns n according to conventional art (n/2).

The coil 7A1 is not immediately connected to the fourth commutator member 14d thereafter, unlike in the conventional method, but is wound between the slots 11a and 11g which are opposed to the slots 11g and 11a in radial directions, i.e., the slots 11a and 11g exist at positions rotated by 180° in the circumferential direction, where the slot 11a exists between the twelfth and first teeth 9 and the slot 11g exists between the sixth and seventh teeth 9, thereby forming a second coil 7A2. Although the coil 7A2 is wound between the same slots 11a and 11g as the coil 7A1, the coil 7A2 is wound by half of the number of turns n according to conventional art (n/2) in an opposite direction to that of the coil 7A1, and is then connected to the fourth commutator member 14d. Thus, an armature coil 7A having paired coils 7A1 and 7A2 opposed to each other in radial directions and connected in series with each other is formed between the third and fourth commutators 14c and 14d.

In case of the motor according to the Embodiment 2, the high-speed brush 21b is located apart by α=60° from the low-speed brush 21a with respect to the circumferential direction. The axis line M is inclined also by 60° to the axis line P. Hence, consideration is taken into a case where an armature coil 7 is short-circuited by the high-speed brush 21b. For example, as shown in FIG. 8, when the high-speed brush 21b contacts the third and fourth commutator members 14c and 14d, the coils 7A1 and 7A2 are short-circuited. At this time, as shown in FIG. 9, the short-circuited coils (7A1 and 7A2) each are wound n/2 turns by full-pitch winding in slots 11a and 11g positioned on the axis line M. The short-circuited coils exist at symmetric positions with respect to the axis line M.

Therefore, the armature coils 7A is distributed evenly to the regions X and Y about the axis line M. Also, with respect to any other given centerline such as an axis line P or Q, the armature coils 7A are located evenly in two halves sectioned by the centerline. As a result of this, in the motor according to the Embodiment 2, short-circuited coils can be located without uneven distribution during normal operation. Electric circuits between brushes are equalized, abrasion of brushes is suppressed, and the product life is extended.

Embodiment 3

Further description will be made of an example of coil winding in a case where the number of winding turns is an odd number, according to the Embodiment 3 of the present invention. If the number of winding turns is an odd number (2n+1), any one of the number of turns of the first and second coils in the embodiment described above is set greater by one than the number of turns of the other one of the first and second coils (n, n+1). However, if the numbers of turns of the first and second coils are thus made different from each other, the first and second coils are not perfectly symmetric to each other, like in the case where the number of winding turns is an even number. Effects of improvements as shown in FIG. 4 are reduced in some cases.

Figure 10:
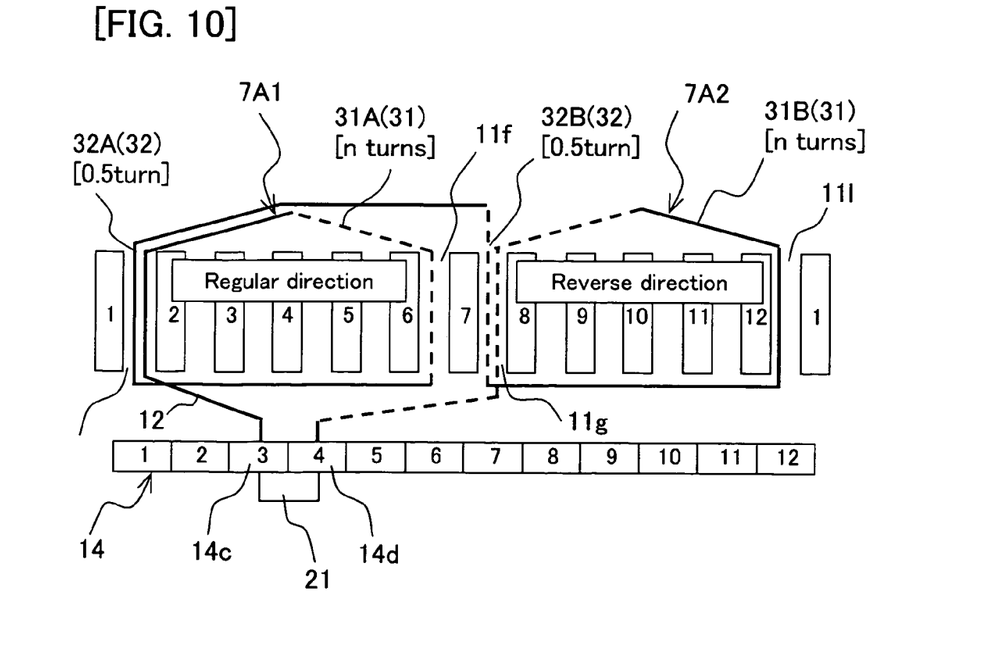
FIG. 10 An exploded view showing a winding state of an armature coil in a motor according to an Embodiment 3 of the present invention.

Hence, the present inventors discussed a winding method by which desired effects of improvements are obtained even if the number of winding turns is an odd number. As a result, it has been confirmed that balanced winding is obtained by a winding method as shown in FIG. 10 even if the number of winding turns is an odd number. FIG. 10 is an exploded view of a winding wire thereof. As shown in FIG. 10, in an armature coil according to the Embodiment 3, for example, an end of the armature coil is wound from the third commutator member 14c, the winding wire 12 wound around the riser of the third commutator member 14c is wound at first between slots 11a and 11f thereby forming a main coil 31A where the slot 11a exists between the first and second teeth 9 and the slot 11f exists between the sixth and seventh teeth 9. The main coil 31A is wound n turns with respect to a required number of turns 2n+1.

After forming the main coil 31A, the winding wire 12 led from the slot 11f is wound along the slot 11a. At this time, the winding wire 12 is not wound along the slot 11f but is wound along the slot 11g. The slot 11g is formed between the seventh and eighth teeth 9 and is located at a position opposed to the slot 11a in a radial direction (rotated by 180° in a circumferential direction about O as the center). As a result of this, a subsidiary coil 32A wound only along the slot 11a by 0.5 turns is formed after the main coil 31A. The main coil 31A and the subsidiary coil 32A are connected in series with each other. The coil 7A1 is formed by both of these coils.

The winding wire 12 wounds along the slot 11g is thereafter wound n turns between the slots 11g and 11l, thereby to form the main coil 31B. At this time, the winding wire 12 wound from the slots 11a to 11g forms a subsidiary coil 32B wound only along the slot 11g by 0.5 turns, before the main coil 31B. The main coil 31B and subsidiary coil 32B are connected in series with each other. A coil 7A2 is formed by both of these coils. The slot 11l is formed between the twelfth and first teeth 9 and is located at a position opposed to the slot 11f in a radial direction. The main coil 31B is wound in a direction opposite to the direction of the coil 7A1.

After being wound n turns between slots 11g and 11l, the winding wire 12 is connected to the fourth commutator member 14d. Thus, an armature coil 7A having paired coils 7A1 and 7A2 opposed to each other in radial directions and connected in series with each other is formed between the third and fourth commutators 14c and 14d. A winding wire 12 is wound between every pair of other adjacent commutator members. The first and second coils each are formed by a main coil 31 and a subsidiary coil 32, to be wound by the same number of turns.

Thus, according to the winding method of the Embodiment 3, the coils 7A1 and 7A2 are respectively formed by the main coils 31A and 31B each wound n turns and by the subsidiary coils 32A and 32B each wound 0.5 turns. An armature coil 7A which is wound 2n+1 turns in total is formed. That is, according to the winding method, the coils 7A1 and 7A2 each are wound the same number of turns (n+0.5 turns each) and are evenly distributed to the regions X and Y with respect to the axis line M, even if the number of winding turns of the armature coil 7A is an odd number (2n+1 turns). Also, with respect to any other given centerline such as an axis line P or Q, the coils 7A1 and 7A2 are located evenly in two halves sectioned by the centerline. Therefore, if the number of winding turns is an odd umber, effects of improvements such as improved durability and reduction in whirling force can be obtained, like in the case of an even number of turns.

Further, since the winding method according to the Embodiment 3 is obtained, the motor 1 according to the present invention is capable of symmetrically distributing short-circuited coils with respect to any given centerlines including the axis line M regardless of whether the number of winding turns is an odd or even number. Therefore, in a motor having a three-brush structure, product life can be extended and vibration/noise can be reduced regardless of the number of winding turns. Although FIG. 10 shows that the armature coil 7 is of short-pitch winding, the present winding method is applicable to full-pitch winding.

The present invention is not limited to the above embodiments but, needless to say, can be variously modified without deviating from the subject matter of the invention.

For example, although the foregoing motor 1 has a structure having twelve slots, the number of slots is not limited to twelve but an even number of 8 or higher may be adopted appropriately. Also in the Embodiment 2, the first and second coils (7A1 and 7A2) each are wound n/2 turns by full pitch winding. However, both of these coils each may be constructed in an n-turn structure. Further, the first and second coils (7A1 and 7A2) in the Embodiment 2 adopt a serial connection method. However, the first and second coils (7A1 and 7A2) can be connected to the commutator members (14c and 14d), according to a parallel connection method, like in FIG. 7.

Note that the second coil (7A2) in the Embodiment 2 need not always be connected between the commutator members (14c and 14d) but may be connected between the commutator members (14i and 14j) which are opposed to and distant from the commutator members (14c and 14d) by 180° in the circumferential direction. Thus, two separate armature coils (n turns) which have different winding directions from each other may be formed in the same slot. In this case, the armature coil is wound n turns in each of the slots (11a and 11g) positioned on the axis line M by full-pitch winding. The armature coils can be arranged at positions symmetric to the axis line M.

On the other side, the foregoing embodiments have been described with respect to a motor used as a drive source of a wiper device. Targets to which the present invention is applied are not limited to an electric motor for a wiper device but the present invention is applicable to other car-mount motors and industrial machines such as robots, personal computers, and IT devices such as peripheral devices of the personal computers.

The invention claimed is:

1. An electric motor comprising:
   a motor housing having an inner circumferential face and paired permanent magnets fixed to the inner circumferential face;
   an armature core attached to a rotation shaft, having an even number of teeth radially extending in radial directions, and an even number of slots formed between teeth and extending along an axis direction;
   a commutator on the rotation shaft and being adjacent to the armature core, and having commutator members arranged in a circumferential direction, the commutator members being equal in number to the slots;
   a first brush which slides on the commutator members of the commutator;
   a second brush provided apart from the first brush by a predetermined angle in a circumferential direction, and configured to slide on the commutator members of the commutator;
   a third brush, provided at a position opposed to the first brush, configured to slide on the commutator members of the commutator such that a current is alternatively supplied between the first brush and the third brush or between the second brush and the third brush, wherein when the current is supplied between the first brush and the third brush, the armature core rotates at a lower rotation speed than a rotation speed of the armature core when the current is supplied between the second brush and the third brush; and
   an armature coil electrically connected between adjacent ones of the commutator members, said armature coil having a first coil wound between the slots and a surrounding plurality of teeth, and a second coil, wound between the slots and another plurality of teeth located at positions point-symmetric to the teeth around which the first coil is wound with respect to a center of the rotation shaft;
   wherein the second coil surrounds the same number of teeth as the first coil and is wound in a direction opposite to a direction in which the first coil is wound, and the first and second coils are wound by an equal number of turns and are connected in series with each other.

2. An electric motor comprising:
   a motor housing having an inner circumferential face and paired permanent magnets fixed to the inner circumferential face;
   an armature core attached to a rotation shaft, having an even number of teeth radially extending in radial directions, and an even number of slots formed between teeth and extending along an axis direction;
   a commutator on the rotation shaft and being adjacent to the armature core, and having commutator members arranged in a circumferential direction, the commutator members being equal in number to the slots;
   a first brush which slides on the commutator members of the commutator;
   a second brush provided apart from the first brush by a predetermined angle in a circumferential direction, and configured to slide on the commutator members of the commutator;
   a third brush, provided at a position opposed to the first brush, configured to slide on the commutator members of the commutator such that a current is selectively supplied between the first brush and the third brush or between the second brush and the third brush, wherein when the current is supplied between the first brush and the third brush, the armature core rotates at a lower rotation speed than a rotation speed of the armature core when the current is supplied between the second brush and the third brush; and
   an armature coil electrically connected between adjacent ones of the commutator members, said armature coil having a first coil wound between the slots and a surrounding plurality of teeth, and a second coil, wound between the slots and another plurality of teeth located at positions point-symmetric to the teeth around which the first coil is wound with respect to a center of the rotation shaft;

wherein the second coil surrounds the same number of teeth as the first coil and is wound in a direction opposite to a direction in which the first coil is wound, and the first and second coils are wound by an equal number of turns and are connected in series with each other.

* * * * *